United States Patent
Ueguchi et al.

(10) Patent No.: US 12,297,590 B2
(45) Date of Patent: May 13, 2025

(54) FOAM SHEET AND SYNTHETIC LEATHER

(71) Applicant: DIC Corporation, Tokyo (JP)

(72) Inventors: Miwa Ueguchi, Takaishi (JP); Tomohiro Tetsui, Takaishi (JP)

(73) Assignee: DIC Corporation, Tokyo (JP)

( * ) Notice: Subject to any disclaimer, the term of this patent is extended or adjusted under 35 U.S.C. 154(b) by 96 days.

(21) Appl. No.: 17/766,576

(22) PCT Filed: Sep. 17, 2020

(86) PCT No.: PCT/JP2020/035177
§ 371 (c)(1),
(2) Date: Apr. 5, 2022

(87) PCT Pub. No.: WO2021/084953
PCT Pub. Date: May 6, 2021

(65) Prior Publication Data
US 2024/0102234 A1  Mar. 28, 2024

(30) Foreign Application Priority Data
Oct. 28, 2019  (JP) .................. 2019-195226

(51) Int. Cl.
*D06N 3/14* (2006.01)
*C08J 9/30* (2006.01)
*D06N 3/00* (2006.01)

(52) U.S. Cl.
CPC .............. *D06N 3/14* (2013.01); *C08J 9/30* (2013.01); *D06N 3/0006* (2013.01); *D06N 3/0036* (2013.01); *D06N 3/0047* (2013.01); *D06N 3/0088* (2013.01); *C08J 2375/04* (2013.01); *D06N 2205/023* (2013.01); *D06N 2205/045* (2013.01); *D06N 2211/28* (2013.01)

(58) Field of Classification Search
CPC ...... D06N 3/14; D06N 3/0006; D06N 3/0036; D06N 3/0047; D06N 3/0088; D06N 2205/023; D06N 2205/045; D06N 2211/28; C08J 9/30; C08J 2375/04
USPC .......................................... 156/78
See application file for complete search history.

(56) References Cited

U.S. PATENT DOCUMENTS

2022/0220250 A1* 7/2022 Fujishita ............ C08G 18/7671

FOREIGN PATENT DOCUMENTS

| CN | 105085854 A | 11/2015 |
|---|---|---|
| CN | 107522841 A | 12/2017 |
| CN | 109130257 A | 1/2019 |
| JP | 2005-273083 A | 10/2005 |
| JP | 2013-119688 A | 6/2013 |
| TW | 201300447 A | 1/2013 |

OTHER PUBLICATIONS

Zhou Hai Feng et al., "The synthesis of high solid content of water-borne polyurethane with solvent-free method," Polymer Chemistry and Physics, Jun. 11, 2009, 39 pages including its English abstract. (cited in the Apr. 19, 2024 CN OA).

* cited by examiner

*Primary Examiner* — James D Sells
(74) *Attorney, Agent, or Firm* — Troutman Pepper Locke LLP

(57) ABSTRACT

A task to be achieved by the invention is to provide a foamed sheet having excellent retention of foam, hand feeling, and peel strength. The present invention provides a foamed sheet which is formed from a water dispersion of a urethane resin (X), wherein the water dispersion has a urethane resin (X) content of 50 to 80% by mass, and the water dispersion contains no organic solvent. Further, the present invention provides a synthetic leather having at least a substrate (i) and a polyurethane layer (ii), wherein the polyurethane layer (ii) is formed from the above-mentioned foamed sheet. The foamed sheet preferably has a density of 200 to 1,000 kg/m$^3$.

14 Claims, No Drawings

FOAM SHEET AND SYNTHETIC LEATHER

TECHNICAL FIELD

The present invention relates to a foamed sheet and a synthetic leather.

BACKGROUND ART

Urethane resins have excellent mechanical strength and hand feeling, and are therefore widely used in the production of synthetic leather (including artificial leather), a coating agent, an adhesive, gloves, clothing, and the like. With respect to the urethane resin, a solvent urethane resin containing N,N-dimethylformamide (DMF) has been mainly used. However, Europe regulates DMF, China and Taiwan strengthen the VOC emissions control, and the major apparel manufacturers regulate DMF, and, under the circumstances, the development of an environment-friendly urethane resin using a weak solvent or an aqueous solvent, or using no solvent, or the like is required.

In this situation, a urethane resin water dispersion (polyurethane dispersion) having a urethane resin dispersed in water is being used in the above-mentioned applications. However, the urethane resin water dispersion has a problem in that such an intermediate porous layer as formed by subjecting a conventional solvent urethane resin to wet coagulation cannot be obtained from the urethane resin water dispersion, so that the resultant layer causes poor hand feeling and flexing resistance and the like. As a method for solving the problem, a method of incorporating microcapsules into the urethane resin water dispersion, a mechanical foaming method of dispersing a gas in the urethane resin water dispersion, and the like have been proposed (see, for example, PTL 1). However, the former method has problems in that the hand feeling is hard and in that expansion of the microcapsules causes poor smoothness, and further the latter method is disadvantageous in that the bubbles in the dispersion are gathered and disappear during drying of the urethane resin water dispersion, making it extremely difficult to control the size and amount of bubbles.

CITATION LIST

Patent Literature

PTL 1: JP-A-2013-119688

SUMMARY OF INVENTION

Technical Problem

A task to be achieved by the invention is to provide a foamed sheet having excellent retention of foam, hand feeling, and peel strength.

Solution to Problem

The invention provides a foamed sheet which is formed from a water dispersion of a urethane resin (X), wherein the water dispersion has a urethane resin (X) content of 50 to 80% by mass, and the water dispersion contains no organic solvent.

Further, the invention provides a synthetic leather having at least a substrate (i) and a polyurethane layer (ii), wherein the polyurethane layer (ii) is formed from the above-mentioned foamed sheet.

Advantageous Effects of Invention

The foamed sheet of the invention has excellent retention of foam, hand feeling, and peel strength. Therefore, the foamed sheet of the invention can be especially advantageously used as an intermediate layer for a synthetic leather.

DESCRIPTION OF EMBODIMENTS

The foamed sheet of the invention is formed from a water dispersion of a specific urethane resin (X).

The urethane resin water dispersion has a urethane resin (X) content of 50 to 80% by mass, and contains no organic solvent.

In the invention, it is necessary that the urethane resin (X) content be in the range of from 50 to 80% by mass. The so-called urethane resin (X) solids content of the water dispersion is high as mentioned above, and therefore, when foaming the water dispersion by mechanical foaming or introducing gas, the water dispersion is excellent in retention of foam, and further the urethane resin water dispersion has improved drying properties, and thus a crack or the like is not caused in the foamed sheet being dried and/or after dried, so that excellent hand feeling, plane smoothness, and peel strength can be achieved. In addition, the urethane resin (X) solids content is such high that the speed of line for drying water can be improved. From the viewpoint of achieving further excellent hand feeling, plane smoothness, and peel strength, the urethane resin (X) content is preferably in the range of from 53 to 70% by mass, more preferably in the range of from 55 to 70% by mass, further preferably in the range of from 57 to 65% by mass.

The urethane resin (X) can be dispersed in water, and, for example, a urethane resin having a hydrophilic group, such as an anionic group, a cationic group, or a nonionic group; a urethane resin which is forcibly dispersed in water using an emulsifying agent, or the like can be used. These urethane resins may be used individually or in combination. Among these, in view of the production stability and water dispersion stability, a urethane resin having a hydrophilic group is preferably used, and a urethane resin having an anionic group and/or a nonionic group is more preferred.

As a method for obtaining the urethane resin having an anionic group, for example, there can be mentioned a method using as a raw material at least one compound selected from the group consisting of a glycol compound having a carboxyl group and a compound having a sulfonyl group.

As the glycol compound having a carboxyl group, for example, 2,2-dimethylolpropionic acid, 2,2-dimethylolbutanoic acid, 2,2-dimethylolbutyric acid, 2,2-dimethylolpropionic acid, 2,2-valeric acid, or the like can be used. These compounds may be used individually or in combination.

As the compound having a sulfonyl group, for example, there can be used 3,4-diaminobutanesulfonic acid, 3,6-diamino-2-toluenesulfonic acid, 2,6-diaminobenzenesulfonic acid, N-(2-aminoethyl)-2-aminosulfonic acid, N-(2-aminoethyl)-2-aminoethylsulfonic acid, N-2-aminoethane-2-aminosulfonic acid, N-(2-aminoethyl)-β-alanine; or a salt thereof. These compounds may be used individually or in combination.

As a method for obtaining the urethane resin having a nonionic group, for example, there can be mentioned a method using a compound having an oxyethylene structure as a raw material.

As the compound having an oxyethylene structure, for example, polyether polyol having an oxyethylene structure, such as polyethylene glycol, polyoxyethylene polyoxypropylene glycol, polyoxyethylene polyoxytetramethylene glycol, or polyethylene glycol dimethyl ether, can be used. These compounds may be used individually or in combination. Of these, from the viewpoint of more easily controlling the hydrophilicity, polyethylene glycol and/or polyethylene glycol dimethyl ether is preferably used.

From the viewpoint of achieving further excellent emulsifiability and water dispersion stability, the raw material used for obtaining the urethane resin having a nonionic group preferably has a number average molecular weight in the range of from 200 to 10,000, more preferably in the range of from 300 to 3,000, more preferably in the range of from 300 to 2,000. The number average molecular weight of the raw material used for obtaining the urethane resin having a nonionic group indicates a value measured by a gel permeation column chromatography (GPC) method.

As a method for obtaining the urethane resin having a cationic group, for example, there can be mentioned a method using one or two or more compounds having an amino group as a raw material.

As the compound having an amino group, for example, there can be used a compound having a primary or secondary amino group, such as triethylenetetramine or diethylenetriamine; a compound having a tertiary amino group, e.g., an N-alkyldialkanolamine, such as N-methyldiethanolamine or N-ethyldiethanolamine, or an N-alkyldiaminoalkylamine, such as N-methyldiaminoethylamine or N-ethyldiaminoethylamine; or the like. These compounds may be used individually or in combination.

As the emulsifying agent which can be used for obtaining the urethane resin forcibly dispersed in water, for example, there can be used a nonionic emulsifying agent, such as polyoxyethylene nonylphenyl ether, polyoxyethylene lauryl ether, polyoxyethylene styrylphenyl ether, polyoxyethylene sorbitol tetraoleate, or a polyethylene-polypropylene copolymer; an anionic emulsifying agent, such as a fatty acid salt, e.g., sodium oleate, or an alkylsulfate salt, an alkylbenzenesulfonic acid salt, an alkylsulfosuccinic acid salt, a naphthalenesulfonic acid salt, a polyoxyethylene alkylsulfuric acid salt, an alkaneslfonate sodium salt, or an alkyl diphenyl ether sulfonic acid sodium salt; a cationic emulsifying agent, such as an alkylamine salt, an alkyltrimethylammonium salt, or an alkyldimethylbenzylammonium salt, or the like. These emulsifying agents may be used individually or in combination.

With respect to the urethane resin (X), specifically, for example, a reaction product of a chain extender (a1), a polyol (a2), a polyisocyanate (a3), and, if necessary, a compound (a4) having a hydrophilic group (raw material used for obtaining the urethane resin having an anionic group, urethane resin having a cationic group, and urethane resin having a nonionic group) can be used.

As the chain extender (a1), a chain extender having a molecular weight of less than 500 (preferably in the range of from 50 to 450) can be used, specifically, there can be used a chain extender having a hydroxyl group, such as ethylene glycol, diethylene glycol, triethylene glycol, propylene glycol, dipropylene glycol, 1,3-propanediol, 1,3-butanediol, 1,4-butanediol, hexamethylene glycol, saccharose, methylene glycol, glycerol, sorbitol, bisphenol A, 4,4'-dihydroxydiphenyl, 4,4'-dihydroxydiphenyl ether, or trimethylolpropane; a chain extender having an amino group, such as ethylenediamine, 1,2-propanediamine, 1,6-hexamethylenediamine, piperazine, 2,5-dimethylpiperazine, isophoronediamine, 1,2-cyclohexanediamine, 1,3-cyclohexanediamine, 1,4-cyclohexanediamine, 4,4'-dicyclohexylmethanediamine, 3,3'-dimethyl-4,4'-dicyclohexylmethanediamine, 1,4-cyclohexanediamine, or hydrazine; or the like. These chain extenders may be used individually or in combination. The molecular weight of the chain extender (a1) indicates a value determined by calculation from the chemical formula.

With respect to the chain extender (a1), from the viewpoint of easily achieving chain extension even at a relatively low temperature of 30° C. or lower to suppress the energy consumption during the reaction, and from the viewpoint of achieving further excellent mechanical strength due to introduction of a urea group, film forming properties, hand feeling, and peel strength, a chain extender having an amino group (hereinafter, referred to simply as "amine chain extender") is preferably used, and, from the viewpoint of achieving further excellent retention of foam, emulsifiability, and water dispersion stability even when increasing the solids content of the urethane resin (X), an amine chain extender having a molecular weight in the range of from 30 to 250 is more preferably used. When two or more types of the chain extenders are used in combination, the molecular weight of the chain extenders means an average of the molecular weights, and the chain extenders may have molecular weights such that the average of the molecular weights falls in the above-mentioned preferred range of the molecular weight.

From the viewpoint of achieving further excellent mechanical strength, film forming properties, hand feeling, peel strength, retention of foam, emulsifiability, and water dispersion stability, and from the viewpoint of further easily increasing the solids content of the urethane resin (X), the amount of the chain extender (a1) used is further preferably in the range of from 0.1 to 30% by mass, especially preferably in the range of from 0.5 to 10% by mass, based on the total mass of the raw materials constituting the urethane resin (X).

As the polyol (a2), for example, polyether polyol, polyester polyol, polyacrylic polyol, polycarbonate polyol, polybutadiene polyol, or the like can be used. These polyols may be used individually or in combination. When the urethane resin having a nonionic group is used as the urethane resin (X), a polyol other than the raw material used for obtaining the urethane resin having a nonionic group is used as the polyol (a2).

From the viewpoint of the mechanical strength of the obtained film, the polyol (a2) preferably has a number average molecular weight in the range of from 500 to 100,000, more preferably in the range of from 800 to 10,000. The number average molecular weight of the polyol (a2) indicates a value measured by a gel permeation column chromatography (GPC) method.

From the viewpoint of achieving further excellent mechanical strength, the amount of the polyol (a2) used is further preferably in the range of from 40 to 90% by mass, especially preferably in the range of from 50 to 80% by mass, based on the total mass of the raw materials constituting the urethane resin (X).

As the polyisocyanate (a3), for example, there can be used an aromatic polyisocyanate, such as phenylene diisocyanate, toluene diisocyanate, diphenylmethane diisocyanate, xylylene diisocyanate, naphthalene diisocyanate, polymethylene polyphenyl polyisocyanate, or carbodiimidated diphenylmethane polyisocyanate; an aliphatic polyisocyanate or alicyclic polyisocyanate, such as hexamethylene diisocyanate, lysine diisocyanate, cyclohexane diisocyanate, isophorone diisocyanate, dicyclohexylmethane diisocyanate, xylylene diisocyanate, tetramethylxylylene diisocyanate, dimer acid diisocyanate, or norbornene diisocyanate, or the like. These polyisocyanates may be used individually or in combination.

From the viewpoint of achieving further excellent mechanical strength, the amount of the polyisocyanate (a3) used is further preferably in the range of from 5 to 40% by mass, especially preferably in the range of from 10 to 35% by mass, based on the total mass of the raw materials constituting the urethane resin (X).

From the viewpoint of achieving further excellent retention of foam, emulsifiability, water dispersion stability, and film forming properties, the amount of the compound (a4) having a hydrophilic group used is preferably 5% by mass or less, more preferably 2% by mass or less, further preferably in the range of from 0.25 to 2% by mass, especially preferably in the range of from 0.5 to 1.8% by mass, based on the total mass of the raw materials constituting the urethane resin (X).

From the viewpoint of achieving further excellent retention of foam, surface smoothness, hand feeling, and film forming properties, the urethane resin (X) preferably has an average particle diameter in the range of from 0.01 to 1 μm, more preferably in the range of from 0.05 to 0.9 μm. A method for measuring the average particle diameter of the urethane resin (X) is described in the Examples shown below.

As the water used in the invention, ion-exchanged water, distilled water, or the like can be used. These waters may be used individually or in combination.

The urethane resin water dispersion used in the invention contains the above-mentioned urethane resin (X) and water as essential components, but may contain an additional additive if necessary.

With respect to the additional additive, for example, there can be used an emulsifying agent, a crosslinking agent, a neutralizing agent, a thickener, a urethane-forming reaction catalyst, a filler, a pigment, a dye, a flame retardant, a leveling agent, an anti-blocking agent, a film forming auxiliary, a foaming agent, or the like. These additives may be used individually or in combination. The additive or additives are appropriately selected according to the purpose for which the foamed sheet is used. The urethane resin water dispersion used in the invention contains no organic solvent in the production process therefor, but it is acceptable for the urethane resin water dispersion to contain an organic solvent as the additive.

The method for producing the urethane resin water dispersion used in the invention is described below.

The method for producing the urethane resin water dispersion used in the invention has the steps of: reacting the above-mentioned polyol (a2), polyisocyanate (a3), and compound (a4) having a hydrophilic group with each other without using a solvent to obtain a urethane prepolymer (i) having an isocyanate group (hereinafter, referred to simply as "prepolymer step"), and then dispersing the urethane prepolymer (i) in the water (hereinafter, referred to simply as "emulsifying step"), and subsequently reacting the above-mentioned chain extender (a1) with the resultant urethane prepolymer to obtain a urethane resin (X) (hereinafter, referred to simply as "chain extension step").

It is important that the prepolymer step is conducted without using a solvent. In conventional techniques, the prepolymer step is generally conducted in an organic solvent, such as methyl ethyl ketone or acetone, but the desolvation step for distilling off the organic solvent is needed after the emulsifying step, and several days of the production duration in the actual production site are required. Further, it is difficult to completely distill off the organic solvent in the desolvation step, and it is likely that a slight amount of the organic solvent inevitably remains, making it difficult to successfully take environmental measures. On the other hand, in the method for producing the urethane resin water dispersion in the invention, the prepolymer step is conducted without using a solvent, and therefore a urethane resin water dispersion containing completely no organic solvent can be obtained, and it is possible to save the power needed for the production process therefor.

Further, when the prepolymer step is conducted by a conventional method using an organic solvent, it is likely that the urethane resin cannot be emulsified, or even if the urethane resin can be emulsified, the resultant urethane resin has a too large particle diameter, and the region in which an excellent urethane resin water dispersion can be obtained is considerably limited. The reason for this has not yet been elucidated, but a reason is considered such that an organic solvent, a neutralizing agent (for controlling the acid value of the urethane resin having an anionic group), or the like inhibits the ability of the hydrophilic group of the urethane resin which is being emulsified.

In contrast, in the invention, the prepolymer step is conducted without using a solvent, and therefore there can be stably obtained a urethane resin water dispersion having an average particle diameter equivalent to that obtained by a conventional method, wherein the urethane resin water dispersion is in the region in which it has been particularly difficult to obtain the urethane resin water dispersion by a conventional method, namely in the region in which the amount of the hydrophilic group introduced is small and a chain extender is reacted with the prepolymer.

From the viewpoint of achieving further excellent retention of foam, surface smoothness, film forming properties, hand feeling, peel strength, and mechanical strength, in the prepolymer step, the molar ratio of the isocyanate group of the polyisocyanate (a3) to the total of the hydroxyl group of the polyol (a2) and the hydroxyl group and amino group of the compound (a4) having a hydrophilic group [isocyanate group/(hydroxyl group and amino group)] is preferably in the range of from 1.1 to 3, more preferably in the range of from 1.2 to 2.

The reaction for the prepolymer step is conducted, for example, at 50 to 120° C. for 1 to 10 hours.

The prepolymer step can be conducted using a reaction vessel having an agitating element; a kneading machine, such as a kneader, a continuous kneader, a taper roll, a single-screw extruder, a twin-screw extruder, a triple-screw extruder, a universal mixing machine, PLASTOMILL, or a Bodeda kneading machine; a rotary dispersion mixing machine, such as TK Homomixer, FILMIX, Ebara Milder, CLEARMIX, ULTRA-TURRAX, CAVITRON, or BIO-MIXER; an ultrasonic dispersing apparatus; an apparatus which has no moving part and is capable of mixing a fluid due to flow of the fluid itself, such as an in-line mixer; or the like.

The emulsifying step is preferably conducted at a temperature at which water is not evaporated, for example, at a temperature in the range of from 10 to 90° C. The emulsifying step can be conducted using an apparatus similar to that used in the prepolymer step. Especially, from the viewpoint of easily obtaining a urethane resin water dispersion having a high urethane resin content, a kneading machine is preferably used, and a twin-screw extruder is more preferred.

The chain extension step is the step of reacting the isocyanate group of the urethane prepolymer (i) and the chain extender (a1) to increase the urethane prepolymer (i) in molecular weight, obtaining a urethane resin (X). With respect to the temperature for the chain extension step, in view of the productivity, the chain extension step is preferably conducted at 50° C. or lower.

From the viewpoint of achieving further excellent film forming properties and mechanical strength, in the chain extension step, the molar ratio of the total of the hydroxyl group and amino group of the chain extender (a1) to the isocyanate group of the urethane prepolymer (i) [(hydroxyl group and amino group)/isocyanate group] is preferably in the range of from 0.8 to 1.1, more preferably in the range of from 0.9 to 1.

The chain extension step can be conducted using an apparatus similar to that used in the prepolymer step.

The foamed sheet of the invention is described below.

The foamed sheet can be produced by obtaining a foamed liquid from the water dispersion of the urethane resin (X), and applying the foamed liquid to a substrate and drying the applied foamed liquid.

As a method for obtaining a foamed liquid from the water dispersion of the urethane resin (X), for example, there can be mentioned manual stirring, a method using a mixer, such as a mechanical mixer, and a method of introducing air or inert gas. When using a mixer, for example, there can be mentioned a method in which the water dispersion is stirred at 500 to 3,000 rpm for 10 seconds to 3 minutes. In this case, from the viewpoint of easily controlling the density of the foamed urethane sheet to be in the preferred range, the foamed liquid obtained after foaming preferably has a volume 1.3 to 7 times, more preferably 1.2 to 2 times, further preferably 1.3 to 1.7 times the volume of the water dispersion of the urethane resin (X) before being foamed.

As a method for applying the obtained foamed liquid to a substrate, such as release paper, for example, there can be mentioned a method using a roll coater, a knife coater, a comma coater, an applicator, or the like.

As a method for drying the applied material, for example, there can be mentioned a method in which the applied material is dried at a temperature of 60 to 130° C. for 30 seconds to 10 minutes.

The foamed sheet obtained by the above-mentioned method has a thickness of, for example, 5 to 200 μm.

From the viewpoint of achieving further excellent hand feeling and peel strength, the foamed sheet preferably has a density in the range of from 200 to 1,000 kg/m$^3$, more preferably in the range of from 300 to 900 kg/m$^3$, further preferably in the range of from 400 to 800 kg/m$^3$. The density of the foamed urethane sheet indicates a value determined by dividing the mass of the foamed urethane sheet by the volume of the foamed urethane sheet.

The synthetic leather of the invention is described below.

The synthetic leather of the invention is a synthetic leather having at least a substrate (i) and a polyurethane layer (ii), wherein the polyurethane layer (ii) is formed from the above-described foamed sheet.

As a method for producing the synthetic leather, for example, there can be mentioned:

(X) a method in which a foamed liquid is obtained from the urethane resin composition, and the obtained foamed liquid is applied onto release paper, and dried, and bonded to the above-mentioned substrate (i), (Y) a method in which a foamed liquid is obtained from the urethane resin composition, and the obtained foamed liquid is applied onto a skin layer formed on release paper, and dried, and bonded to the substrate (i), and (Z) a method in which a foamed liquid is obtained from the urethane resin composition, and the obtained foamed liquid is applied onto the substrate (i), and dried, and, if necessary, a skin layer (iii) formed on release paper is bonded onto the resultant substrate.

As the substrate (i), for example, there can be used a fiber substrate, such as nonwoven fabric, woven fabric, or knitted fabric, each formed from a polyester fiber, a polyethylene fiber, a nylon fiber, an acrylic fiber, a polyurethane fiber, an acetate fiber, a rayon fiber, a polylactic acid fiber, cotton, linen, silk, wool, a glass fiber, a carbon fiber, a mixed fiber thereof, or the like; the above-mentioned nonwoven fabric which is impregnated with a resin, such as a polyurethane resin; the above-mentioned nonwoven fabric which has further formed thereon a porous layer; or a resin substrate, such as a thermoplastic urethane (TPU).

The polyurethane layer (ii) is formed from the foamed sheet, and, from the viewpoint of obtaining a synthetic leather having both further excellent hand feeling and peel strength, the polyurethane layer (ii) preferably has a density in the range of from 200 to 1,000 kg/m$^3$, preferably in the range of from 300 to 900 kg/m$^3$, more preferably in the range of from 400 to 800 kg/m$^3$. The density of the polyurethane layer (ii) indicates a value determined by dividing a value, which is obtained by subtracting the weight of the substrate (i) 10 cm square from the weight of the synthetic leather 10 cm square, by the thickness of the polyurethane layer (ii). The density of the polyurethane layer (ii) can be controlled by appropriately foaming the urethane resin composition.

The skin layer (iii) can be formed by a known method from a known material, and, for example, a solvent urethane resin, an aqueous urethane resin, a silicone resin, a polypropylene resin, a polyester resin, or the like can be used. In the case of particularly achieving soft hand feeling and excellent heat resistance and hydrolytic resistance, a polycarbonate urethane resin is preferably used. Further, for reducing the use of DMF to protect the environment, an aqueous polycarbonate urethane resin is more preferably used.

On the skin layer (iii), if necessary, a surface treatment layer (iv) may be formed for the purpose of improving the marring resistance and the like. The surface treatment layer (iv) can be formed by a known method from a known material.

EXAMPLES

Hereinbelow, the invention will be described in more detail with reference to the following Examples.

Synthesis Example 1

1,000 Parts by mass of polyether polyol ("PTMG 2000", manufactured by Mitsubishi Chemical Corporation; number average molecular weight: 2,000; hereinafter, abbreviated to "PTMG 2000"), 24 parts by mass of 2,2-dimethylolpropionic acid (hereinafter, abbreviated to "DMPA"), and 262 parts by mass of dicyclohexylmethane diisocyanate (hereinafter, abbreviated to "HMDI") were reacted in the presence of 0.1 part by mass of tin(II) octylate at 100° C. until the NCO % reached 2.1% by mass to obtain a urethane prepolymer A1.

A1 heated to 70° C., triethylamine, a 20% by mass aqueous solution of sodium dodecylbenzenesulfonate ("NEOGEN S-20F", manufactured by Dai-ichi Kogyo Seiyaku Co., Ltd.) as an emulsifying agent, and water were fed at the same time to a twin-screw extruder (TEM-18SS, manufactured by Toshiba Machine Co., Ltd.) and mixed with each other to obtain an emulsion. The respective feed rates of the liquids fed were as follows: A1: 10 kg/hour; triethylamine: 0.2 kg/hour; aqueous solution of emulsifying agent: 2.5 kg/hour; water: 5.1 kg/hour; and operating conditions for the twin-screw extruder were those at 50° C. and 260 rpm.

Then, immediately a water diluted liquid of isophoronediamine (hereinafter, abbreviated to "IPDA") having an amino group content corresponding to 95% of the NCO group was added to cause chain extension, so that a polyurethane emulsion (X-1) having a urethane resin content of 50% by mass was finally obtained.

Synthesis Example 2

1,000 Parts by mass of PTMG 2000, 24 parts by mass of DMPA, and 262 parts by mass of HMDI were reacted in the presence of 0.1 part by mass of tin(II) octylate at 100° C. until the NCO % reached 2.1% by mass to obtain a urethane prepolymer A2.

A2 heated to 70° C., triethylamine, a polypropylene-polyethylene copolymer ("PLURONIC L-64", manufactured by ADEKA Corporation) as an emulsifying agent, and water were fed at the same time to a twin-screw extruder (TEM-18SS, manufactured by Toshiba Machine Co., Ltd.) and mixed with each other to obtain an emulsion. The respective feed rates of the liquids fed were as follows: A2: 10 kg/hour; triethylamine: 0.2 kg/hour; L-64: 0.5 kg/hour; water: 7.1 kg/hour; and operating conditions for the twin-screw extruder were those at 50° C. and 260 rpm.

Then, immediately a water diluted liquid of IPDA having an amino group content corresponding to 95% of the NCO group was added to cause chain extension, so that a polyurethane emulsion (X-2) having a urethane resin content of 50% by mass was finally obtained.

Synthesis Example 3

1,000 Parts by mass of PTMG 2000, 24 parts by mass of DMPA, and 262 parts by mass of HMDI were reacted in the presence of 0.1 part by mass of tin(II) octylate at 100° C. until the NCO % reached 2.1% by mass to obtain a urethane prepolymer A3.

A3 heated to 70° C., triethylamine, and water were fed at the same time to a twin-screw extruder (TEM-18SS, manufactured by Toshiba Machine Co., Ltd.) and mixed with each other to obtain an emulsion. The respective feed rates of the liquids fed were as follows: A3: 10 kg/hour; triethylamine: 0.2 kg/hour; water: 6.6 kg/hour; and operating conditions for the twin-screw extruder were those at 50° C. and 260 rpm.

Then, immediately a water diluted liquid of IPDA having an amino group content corresponding to 95% of the NCO group was added to cause chain extension, so that a polyurethane emulsion (X-3) having a urethane resin content of 50% by mass was finally obtained.

Synthesis Example 4

1,000 Parts by mass of PTMG 2000, 18 parts by mass of polyethylene glycol ("PEG 600", manufactured by NOF Corporation; number average molecular weight: 600; hereinafter, abbreviated to "PEG"), and 262 parts by mass of HMDI were reacted in the presence of 0.1 part by mass of tin(II) octylate at 100° C. until the NCO % reached 3.1% by mass to obtain a urethane prepolymer A4.

A4 heated to 70° C., a 20% by mass aqueous solution of sodium dodecylbenzenesulfonate ("NEOGEN S-20F", manufactured by Dai-ichi Kogyo Seiyaku Co., Ltd.) as an emulsifying agent, and water were fed at the same time to a twin-screw extruder (TEM-18SS, manufactured by Toshiba Machine Co., Ltd.) and mixed with each other to obtain an emulsion. The respective feed rates of the liquids fed were as follows: A4: 10 kg/hour; aqueous solution of emulsifying agent: 2.5 kg/hour; water: 0.1 kg/hour; and operating conditions for the twin-screw extruder were those at 50° C. and 260 rpm.

Then, immediately a water diluted liquid of IPDA having an amino group content corresponding to 95% of the NCO group was added to cause chain extension, so that a polyurethane emulsion (X-4) having a urethane resin content of 60% by mass was finally obtained.

Synthesis Example 5

1,000 Parts by mass of PTMG 2000, 18 parts by mass of PEG, and 262 parts by mass of HMDI were reacted in the presence of 0.1 part by mass of tin(II) octylate at 100° C. until the NCO % reached 3.1% by mass to obtain a urethane prepolymer A5.

A5 heated to 70° C., a polypropylene-polyethylene copolymer ("PLURONIC L-64", manufactured by ADEKA Corporation) as an emulsifying agent, and water were fed at the same time to a twin-screw extruder (TEM-18SS, manufactured by Toshiba Machine Co., Ltd.) and mixed with each other to obtain an emulsion. The respective feed rates of the liquids fed were as follows: A5: 10 kg/hour; emulsifying agent: 0.5 kg/hour; water: 5.8 kg/hour; and operating conditions for the twin-screw extruder were those at 50° C. and 260 rpm.

Then, immediately a water diluted liquid of IPDA having an amino group content corresponding to 95% of the NCO group was added to cause chain extension, so that a polyurethane emulsion (X-5) having a urethane resin content of 60% by mass was finally obtained.

Synthesis Example 6

1,000 Parts by mass of PTMG 2000, 18 parts by mass of polyethylene glycol dimethyl ether ("M550", manufactured by NOF Corporation; number average molecular weight: 550; hereinafter, abbreviated to "MPEG"), and 262 parts by mass of HMDI were reacted in the presence of 0.1 part by mass of tin(II) octylate at 100° C. until the NCO % reached 3.3% by mass to obtain a urethane prepolymer A6.

A6 heated to 70° C. and water were fed at the same time to a twin-screw extruder (TEM-18SS, manufactured by Toshiba Machine Co., Ltd.) and mixed with each other to obtain an emulsion. The respective feed rates of the liquids fed were as follows: A6: 10 kg/hour; water: 4.9 kg/hour; and operating conditions for the twin-screw extruder were those at 50° C. and 260 rpm.

Then, immediately a water diluted liquid of IPDA having an amino group content corresponding to 95% of the NCO group was added to cause chain extension, so that a polyurethane emulsion (X-6) having a urethane resin content of 50% by mass was finally obtained.

Synthesis Example 7

1,000 Parts by mass of PTMG 2000, 18 parts by mass of PEG, and 262 parts by mass of HMDI were reacted in the presence of 0.1 part by mass of tin(II) octylate at 100° C. until the NCO % reached 3.1% by mass to obtain a urethane prepolymer A7.

A7 heated to 70° C. and, as an emulsifying agent, a 20% by mass aqueous solution of sodium dodecylbenzenesulfonate ("NEOGEN S-20F", manufactured by Dai-ichi Kogyo Seiyaku Co., Ltd.) and a polypropylene-polyethylene copolymer ("PLURONIC L-64", manufactured by ADEKA Corporation), and water were fed at the same time to a twin-screw extruder (TEM-18SS, manufactured by Toshiba Machine Co., Ltd.) and mixed with each other to obtain an emulsion. The respective feed rates of the liquids fed were as follows: A7: 10 kg/hour; aqueous solution of emulsifying agent S-20F: 1.3 kg/hour; emulsifying agent L-64: 0.3 kg/hour; water: 1.1 kg/hour; and operating conditions for the twin-screw extruder were those at 50° C. and 260 rpm.

Then, immediately a water diluted liquid of ethylenediamine (hereinafter, abbreviated to "EA") having an amino group content corresponding to 95% of the NCO group was added to cause chain extension, so that a polyurethane emulsion (X-7) having a urethane resin content of 60% by mass was finally obtained.

Comparative Synthesis Example 1

1,000 Parts by mass of PTMG 2000, 34 parts by mass of DMPA, and 262 parts by mass of HMDI were reacted in the presence of 0.1 part by mass of tin(II) octylate at 100° C. until the NCO % reached 1.6% by mass to obtain a urethane prepolymer A'1.

A'1 heated to 70° C., triethylamine, a 20% by mass aqueous solution of sodium dodecylbenzenesulfonate ("NEOGEN S-20F", manufactured by Dai-ichi Kogyo Seiyaku Co., Ltd.) as an emulsifying agent, and water were fed at the same time to a twin-screw extruder (TEM-18SS, manufactured by Toshiba Machine Co., Ltd.) and mixed with each other to obtain an emulsion.

Preparation of a polyurethane emulsion having a solids concentration of 50% was attempted using the same liquids fed and operating conditions for the twin-screw extruder as those in Example 1, and a water diluted liquid of IPDA having an amino group content corresponding to 95% of the NCO group was immediately added to the obtained emulsion to cause chain extension, but gelation occurred, so that an emulsion was not able to be obtained.

Therefore, a polyurethane emulsion having the water amount increased or having the solids content reduced was prepared. The respective feed rates of the liquids fed were as follows: A'1: 10 kg/hour; triethylamine: 0.2 kg/hour; aqueous solution of emulsifying agent: 2.5 kg/hour; water: 19.6 kg/hour; and operating conditions for the twin-screw extruder were those at 50° C. and 260 rpm.

Then, immediately a water diluted liquid of IPDA having an amino group content corresponding to 95% of the NCO group was added to cause chain extension, so that a polyurethane emulsion (XR-1) having a urethane resin content of 30% by mass was finally obtained.

Comparative Synthesis Example 2

1,000 Parts by mass of PTMG 2000, 34 parts by mass of DMPA, and 262 parts by mass of HMDI were reacted in the presence of 0.1 part by mass of tin(II) octylate at 100° C. until the NCO % reached 1.6% by mass to obtain a urethane prepolymer A'2.

A'2 heated to 70° C., triethylamine, a polypropylene-polyethylene copolymer ("PLURONIC L-64", manufactured by ADEKA Corporation) as an emulsifying agent, and water were fed at the same time to a twin-screw extruder (TEM-18SS, manufactured by Toshiba Machine Co., Ltd.) and mixed with each other to obtain an emulsion.

Preparation of a polyurethane emulsion having a urethane resin content of 50% by mass was attempted using the same liquids fed and operating conditions for the twin-screw extruder as those in Example 2, and a water diluted liquid of IPDA having an amino group content corresponding to 95% of the NCO group was immediately added to the obtained emulsion to cause chain extension, but gelation occurred, so that an emulsion was not able to be obtained.

Therefore, a polyurethane emulsion having the water amount increased or having the solids content reduced was prepared. The respective feed rates of the liquids fed were as follows: A'2: 10 kg/hour; triethylamine: 0.2 kg/hour; aqueous solution of emulsifying agent: 0.5 kg/hour; water: 21.6 kg/hour; and operating conditions for the twin-screw extruder were those at 50° C. and 260 rpm.

Then, immediately a water diluted liquid of IPDA having an amino group content corresponding to 95% of the NCO group was added to cause chain extension, so that a polyurethane emulsion (XR-2) having a urethane resin content of 30% by mass was finally obtained.

Comparative Synthesis Example 3

1,000 Parts by mass of PTMG 2000, 34 parts by mass of DMPA, and 262 parts by mass of HMDI were reacted in the presence of 0.1 part by mass of tin(II) octylate at 100° C. until the NCO % reached 1.6% by mass to obtain a urethane prepolymer A'3.

A'3 heated to 70° C., triethylamine, and water were fed at the same time to a twin-screw extruder (TEM-18SS, manufactured by Toshiba Machine Co., Ltd.) and mixed with each other to obtain an emulsion.

Preparation of a polyurethane emulsion having a urethane resin content of 50% by mass was attempted using the same liquids fed and operating conditions for the twin-screw extruder as those in Example 3, and a water diluted liquid of IPDA having an amino group content corresponding to 95% of the NCO group was immediately added to the obtained emulsion to cause chain extension, but gelation occurred, so that an emulsion was not able to be obtained.

Therefore, a polyurethane emulsion having the water amount increased or having the solids content reduced was prepared. The respective feed rates of the liquids fed were as follows: A'3: 10 kg/hour; triethylamine: 0.2 kg/hour; aqueous solution of emulsifying agent: 0.5 kg/hour; water: 20.4 kg/hour; and operating conditions for the twin-screw extruder were those at 50° C. and 260 rpm.

Then, immediately a water diluted liquid of IPDA having an amino group content corresponding to 95% of the NCO group was added to cause chain extension, so that a polyurethane emulsion (XR-3) having a urethane resin content of 30% by mass was finally obtained.

Comparative Synthesis Example 4

1,000 Parts by mass of PTMG 2000, 75 parts by mass of PEG, and 262 parts by mass of HMDI were reacted in the presence of 0.1 part by mass of tin(II) octylate at 100° C. until the NCO % reached 2.4% by mass to obtain a urethane prepolymer A'4.

A'4 heated to 70° C., a 20% by mass aqueous solution of sodium dodecylbenzenesulfonate ("NEOGEN S-20F", manufactured by Dai-ichi Kogyo Seiyaku Co., Ltd.) as an emulsifying agent, and water were fed at the same time to a twin-screw extruder (TEM-18SS, manufactured by Toshiba Machine Co., Ltd.) and mixed with each other to obtain an emulsion.

Preparation of a polyurethane emulsion having a urethane resin content of 60% by mass was attempted using the same liquids fed and operating conditions for the twin-screw extruder as those in Example 4, and a water diluted liquid of IPDA having an amino group content corresponding to 95% of the NCO group was immediately added to the obtained emulsion to cause chain extension, but gelation occurred, so that an emulsion was not able to be obtained.

Therefore, a polyurethane emulsion having the water amount increased or having the solids content reduced was prepared. The respective feed rates of the liquids fed were as follows: A'4: 10 kg/hour; aqueous solution of emulsifying agent: 2.5 kg/hour; water: 9.3 kg/hour; and operating conditions for the twin-screw extruder were those at 50° C. and 260 rpm.

Then, immediately a water diluted liquid of IPDA having an amino group content corresponding to 95% of the NCO group was added to cause chain extension, so that a polyurethane emulsion (XR-4) having a urethane resin content of 40% by mass was finally obtained.

Comparative Synthesis Example 5

1,000 Parts by mass of PTMG 2000, 75 parts by mass of PEG, and 262 parts by mass of HMDI were reacted in the presence of 0.1 part by mass of tin(II) octylate at 100° C. until the NCO % reached 2.4% by mass to obtain a urethane prepolymer A'5.

A'5 heated to 70° C., a 20% by mass aqueous solution of sodium dodecylbenzenesulfonate ("NEOGEN S-20F", manufactured by Dai-ichi Kogyo Seiyaku Co., Ltd.) as an emulsifying agent, and water were fed at the same time to a twin-screw extruder (TEM-18SS, manufactured by Toshiba Machine Co., Ltd.) and mixed with each other to obtain an emulsion.

Preparation of a polyurethane emulsion having a urethane resin content of 50% by mass was attempted using the same liquids fed and operating conditions for the twin-screw extruder as those in Example 5, and a water diluted liquid of IPDA having an amino group content corresponding to 95% of the NCO group was immediately added to the obtained emulsion to cause chain extension, but gelation occurred, so that an emulsion was not able to be obtained.

Therefore, a polyurethane emulsion having the water amount increased or having the solids content reduced was prepared. The respective feed rates of the liquids fed were as follows: A'S: 10 kg/hour; aqueous solution of emulsifying agent: 0.5 kg/hour; water: 11.3 kg/hour; and operating conditions for the twin-screw extruder were those at 50° C. and 260 rpm.

Then, immediately a water diluted liquid of IPDA having an amino group content corresponding to 95% of the NCO group was added to cause chain extension, so that a polyurethane emulsion (XR-5) having a urethane resin content of 40% by mass was finally obtained.

Comparative Synthesis Example 6

1,000 Parts by mass of PTMG 2000, 69 parts by mass of MPEG, and 262 parts by mass of HMDI were reacted in the presence of 0.1 part by mass of tin(II) octylate at 100° C. until the NCO % reached 2.8% by mass to obtain a urethane prepolymer A'6.

A'6 heated to 70° C. and water were fed at the same time to a twin-screw extruder (TEM-18SS, manufactured by Toshiba Machine Co., Ltd.) and mixed with each other to obtain an emulsion.

Preparation of a polyurethane emulsion having a urethane resin content of 50% by mass was attempted using the same liquids fed and operating conditions for the twin-screw extruder as those in Example 6, and a water diluted liquid of IPDA having an amino group content corresponding to 95% of the NCO group was immediately added to the obtained emulsion to cause chain extension, but gelation occurred, so that an emulsion was not able to be obtained.

Therefore, a polyurethane emulsion having the water amount increased or having the solids content reduced was prepared. The respective feed rates of the liquids fed were as follows: A'6: 10 kg/hour; water: 10.3 kg/hour; and operating conditions for the twin-screw extruder were those at 50° C. and 260 rpm.

Then, immediately a water diluted liquid of IPDA having an amino group content corresponding to 95% of the NCO group was added to cause chain extension, so that a polyurethane emulsion (XR-6) having a urethane resin content of 40% by mass was finally obtained.

Example 1

1,000 Parts by mass of the polyurethane emulsion (X-1) obtained in Synthesis Example 1 and 2 parts by mass of a thickener ("Borchi Gel ALA", manufactured by Borchers GmbH) were stirred at 2,000 rpm using a mechanical mixer to prepare a blend. Then, the blend and air were continuously fed to a rotor-stator continuous mixer ("MagicLab", manufactured by IKA) and mixed to obtain a foamed liquid. In this instance, a volume and weight of the foamed liquid were measured and a density was determined, and the feed rate of air was controlled so that the density of the foamed liquid became 2/3.

[Evaluation Method for Retention of Foam]
(1) Evaluation by Observing Appearance The obtained foamed liquid was applied onto polyester woven fabric using a bar coater so that the thickness after the application became 1,000 μm, and dried by means of a hot-air dryer at 70° C. for 2 minutes and further at 120° C. for 2 minutes to form processed fabric, and the processed fabric was evaluated in respect of retention of foam according to the following criteria.

"A": The polyurethane layer forms a foamed sheet having excellent appearance.
"B": A crack is caused in the polyurethane layer.
"C": Foam has disappeared from the polyurethane layer.
(2) Evaluation by Means of a Microscope A cross-section of the obtained processed fabric was observed using a scanning electron microscope ("SU3500", manufactured by Hitachi High-Technologies Corporation; magnification: 200 times), and evaluated according to the following criteria.

"T": Foam is found in the polyurethane layer.
"F": No foam is found in the polyurethane layer.
[Evaluation Method for Hand Feeling]

The obtained processed fabric was evaluated by touch according to the following criteria.

"A": Excellent flexibility.
"B": Slight flexibility.
"C": Poor flexibility.
"D": Hard.

[Evaluation Method for Peel Strength]

A hot-melt tape having a width of 2.5 cm ("BW-2", manufactured by San Chemicals, Ltd.) was placed on the polyurethane layer surface of the obtained processed fabric, and heated at 150° C. for 30 seconds so that the hot-melt tape was bonded to the polyurethane layer. A specimen having the width of the hot-melt tape was cut. A part of the specimen was peeled, and the substrate and the hot-melt tape were held by chucks, and, using Autograph (manufactured by Shimadzu Corporation), a peel strength was measured. An average of the obtained data was determined and converted to a value per 1 cm width, and evaluated according to the following criteria.

"T": The peel strength was 3.0 (kgf/cm) or more.
"F": The peel strength was less than 3.0 (kgf/cm).

[Evaluation Method for Foamed Sheet Density]

The obtained processed fabric was cut into a specimen 10 cm square, and then a weight of the specimen was measured. Further, using a thickness meter, a thickness of the specimen was measured. A weight and thickness of the polyester woven fabric were similarly measured, and, from a difference in weight and a difference in thickness between the specimen and the polyester woven fabric, a density of the foamed sheet was determined by calculation according to the following formula (1).

$$\text{Foamed sheet density} = \frac{(\text{Weight (g) of the processed fabric} - \text{Weight (g) of the polyester woven fabric}) \div 1000}{(\text{Thickness (μm) of the processed fabric} - \text{Thickness (μm) of the polyester woven fabric}) \div 1000000 \times 0.1 \times 0.1} \quad (1)$$

[Method for Measuring a Number Average Molecular Weight]

The number average molecular weight of the polyol and the like used in the Synthesis Examples and Comparative Synthesis Examples is a value as measured by a gel permeation column chromatography (GPC) method under the conditions shown below.

Measuring apparatus: High-speed GPC apparatus ("HLC-8220GPC", manufactured by Tosoh Corp.)
Columns: The columns shown below, manufactured by Tosoh Corp., which were connected in series were used.
"TSKgel G5000" (7.8 mm I.D.×30 cm)×1
"TSKgel G4000" (7.8 mm I.D.×30 cm)×1
"TSKgel G3000" (7.8 mm I.D.×30 cm)×1
"TSKgel G2000" (7.8 mm I.D.×30 cm)×1
Detector: RI (differential refractometer)
Column temperature: 40° C.
Eluent: Tetrahydrofuran (THF)
Flow rate: 1.0 mL/minute
Sample amount per injection: 100 μL (tetrahydrofuran solution having a sample concentration of 0.4% by mass)
Standard sample: A calibration curve was prepared using the standard polystyrenes shown below.

(Standard Polystyrenes)
"TSKgel standard polystyrene A-500", manufactured by Tosoh Corp.
"TSKgel standard polystyrene A-1000", manufactured by Tosoh Corp.
"TSKgel standard polystyrene A-2500", manufactured by Tosoh Corp.
"TSKgel standard polystyrene A-5000", manufactured by Tosoh Corp.
"TSKgel standard polystyrene F-1", manufactured by Tosoh Corp.
"TSKgel standard polystyrene F-2", manufactured by Tosoh Corp.
"TSKgel standard polystyrene F-4", manufactured by Tosoh Corp.
"TSKgel standard polystyrene F-10", manufactured by Tosoh Corp.
"TSKgel standard polystyrene F-20", manufactured by Tosoh Corp.
"TSKgel standard polystyrene F-40", manufactured by Tosoh Corp.
"TSKgel standard polystyrene F-80", manufactured by Tosoh Corp.
"TSKgel standard polystyrene F-128", manufactured by Tosoh Corp.
"TSKgel standard polystyrene F-288", manufactured by Tosoh Corp.
"TSKgel standard polystyrene F-550", manufactured by Tosoh Corp.

[Method for Measuring an Average Particle Diameter of the Urethane Resin (X)]

With respect to each of the urethane resin water dispersions obtained in the Examples and Comparative Examples, using a laser diffraction/scattering particle size distribution measurement apparatus ("LA-910", manufactured by Horiba, Ltd.), and using water as a dispersing medium, an average particle diameter was measured when the relative refractive index was 1.10 and the particle diameter standard was an area.

Examples 2 to 7 and Comparative Examples 1 to 6

Processed fabrics were individually obtained in substantially the same manner as in Example 1 except that the type of the polyurethane emulsion (X-1) used was changed as shown in Tables 1 and 2, and evaluated in respect of the retention of foam, hand feeling, and peel strength.

TABLE 1

|  |  | Example 1 | Example 2 | Example 3 | Example 4 | Example 5 | Example 6 | Example 7 |
|---|---|---|---|---|---|---|---|---|
| Chain extender (a1) | Type | IPDA | IPDA | IPDA | IPDA | IPDA | IPDA | EA |
|  | Molecular weight | 170.3 | 170.3 | 170.3 | 170.3 | 170.3 | 170.3 | 60.1 |
| Compound (a4) having hydrophilic group | Type | DMPA | DMPA | DMPA | PEG | PEG | MPEG | PEG |
|  | Amount (% By mass) | 1.8 | 1.8 | 1.8 | 1.5 | 1.5 | 1.4 | 1.5 |
| Urethane resin (X) content (% By mass) |  | 50 | 50 | 50 | 50 | 60 | 50 | 60 |
| Average particle diameter (μm) of urethane resin (X) |  | 0.23 | 0.28 | 0.81 | 0.19 | 0.18 | 0.51 | 0.18 |

TABLE 1-continued

| | | Example 1 | Example 2 | Example 3 | Example 4 | Example 5 | Example 6 | Example 7 |
|---|---|---|---|---|---|---|---|---|
| Emulsifying agent | Type | Anionic emulsifying agent | Nonionic emulsifying agent | None | Anionic emulsifying agent | Nonionic emulsifying agent | None | Anionic emulsifying agent, Nonionic emulsifying agent |
| Evaluation of retention of foam (1) | | A | A | A | A | A | A | A |
| Evaluation of retention of foam (2) | | T | T | T | T | T | T | T |
| Evaluation of hand feeling | | B | B | B | A | A | A | A |
| Evaluation of peel strength | | T | T | T | T | T | T | T |
| Density of foamed layer (kg/m3) | | 680 | 670 | 690 | 630 | 640 | 680 | 660 |

TABLE 2

| | | Comparative Example 1 | Comparative Example 2 | Comparative Example 3 | Comparative Example 4 | Comparative Example 5 | Comparative Example 6 |
|---|---|---|---|---|---|---|---|
| Chain extender (a1) | Type | IPDA | IPDA | IPDA | IPDA | IPDA | IPDA |
| | Molecular weight | 170.3 | 170.3 | 170.3 | 170.3 | 170.3 | 170.3 |
| Compound (a4) having hydrophilic group | Type | DMPA | DMPA | DMPA | PEG | PEG | MPEG |
| | Amount (% By mass) | 2.6 | 2.6 | 2.6 | 5.6 | 5.6 | 5.2 |
| Urethane resin (X) content (% By mass) | | 30 | 30 | 30 | 40 | 40 | 40 |
| Average particle diameter (μm) of urethane resin (X) | | 0.02 | 0.02 | 0.03 | 0.12 | 0.13 | 0.3 |
| Emulsifying agent | Type | Anionic emulsifying agent | Nonionic emulsifying agent | None | Anionic emulsifying agent | Nonionic emulsifying agent | None |
| Evaluation of retention of foam (1) | | C | C | C | B | B | B |
| Evaluation of retention of foam (2) | | T | T | F | T | T | T |
| Evaluation of hand feeling | | C | C | D | B | B | B |
| Evaluation of peel strength | | T | T | T | F | F | F |
| Density of foamed layer (kg/m3) | | 870 | 830 | 950 | 650 | 660 | 620 |

With respect to the foamed sheet of the invention, as seen from Examples 1 to 7, it was found that the urethane resin water dispersion is stably obtained and excellent film forming properties are achieved.

On the other hand, in Comparative Examples 1 to 3 which correspond to an embodiment using the urethane resin having an anionic group, in which the urethane resin (X) content is less than the range defined in the invention, the retention of foam and hand feeling were poor. In Comparative Examples 4 to 6 which correspond to an embodiment using the urethane resin having a nonionic group, in which the urethane resin (X) content is less than the range defined in the invention, the peel strength was poor.

The invention claimed is:

1. A foamed sheet which is formed from a water dispersion of a urethane resin (X),
   wherein the urethane resin (X) has a nonionic group,
   wherein the urethane resin (X) uses a compound (a4) having a hydrophilic group as a raw material,
   wherein the amount of the compound (a4) used is 0.25 to 5% by mass or less, based on the total mass of the raw materials constituting the urethane resin (X),
   wherein the water dispersion has a urethane resin (X) content of 50 to 80% by mass, and the water dispersion contains no organic solvent.

2. The foamed sheet according to claim 1, which has a density of 200 to 1,000 kg/m$^3$.

3. The foamed sheet according to claim 1, wherein the urethane resin (X) uses a chain extender (a1) as a raw material.

4. The foamed sheet according to claim 3, wherein the chain extender (a1) has an amino group.

5. The foamed sheet according to claim 1, wherein the urethane resin (X) has an average particle diameter in the range of from 0.01 to 1 μm.

6. A synthetic leather having at least a substrate (i) and a polyurethane layer (ii), wherein the polyurethane layer (ii) is formed from the foamed sheet according to claim 1.

7. The foamed sheet according to claim 2, wherein the urethane resin (X) uses a chain extender (a1) as a raw material.

8. The foamed sheet according to claim 2, wherein the urethane resin (X) has an average particle diameter in the range of from 0.01 to 1 μm.

9. The foamed sheet according to claim 3, wherein the urethane resin (X) has an average particle diameter in the range of from 0.01 to 1 μm.

10. The foamed sheet according to claim 4, wherein the urethane resin (X) has an average particle diameter in the range of from 0.01 to 1 μm.

11. A synthetic leather having at least a substrate (i) and a polyurethane layer (ii),
    wherein the polyurethane layer (ii) is formed from the foamed sheet according to claim 2.

12. A synthetic leather having at least a substrate (i) and a polyurethane layer (ii), wherein the polyurethane layer (ii) is formed from the foamed sheet according to claim 3.

13. The foamed sheet according to claim 1, wherein the compound (a4) is a compound having an oxyethylene structure.

14. The foamed sheet according to claim 1, wherein the compound (a4) is a compound having an oxyethylene structure and is selected from a group consisting of: polyethylene glycol, polyethylene glycol dimethyl ether, and combinations thereof.

\* \* \* \* \*